United States Patent [19]
Frid et al.

[11] Patent Number: 5,937,200
[45] Date of Patent: Aug. 10, 1999

[54] USING FIRMWARE TO ENHANCE THE FUNCTIONALITY OF A CONTROLLER

[75] Inventors: Aleksandr Frid, San Francisco; Anthony P. Casano, Felton, both of Calif.

[73] Assignee: Phoenix Technologies Ltd., San Jose, Calif.

[21] Appl. No.: 08/975,557

[22] Filed: Nov. 21, 1997

[51] Int. Cl.$^6$ .............................. G06F 9/46; G06F 9/00
[52] U.S. Cl. ........................................... 395/737; 395/670
[58] Field of Search .................................. 395/737, 670, 395/673, 712, 750.05; 340/825.51

[56] References Cited

U.S. PATENT DOCUMENTS

| | | | |
|---|---|---|---|
| 4,145,735 | 3/1979 | Soga ........................................ | 395/737 |
| 4,318,173 | 3/1982 | Freedman et al. ...................... | 395/673 |
| 4,612,418 | 9/1986 | Takeda et al. ........................... | 379/146 |
| 5,446,898 | 8/1995 | Bealkowski et al. ................... | 395/651 |
| 5,530,861 | 6/1996 | Diamant et al. ............................ | 705/8 |
| 5,548,763 | 8/1996 | Combs et al. ......................... | 395/750.05 |
| 5,555,416 | 9/1996 | Owens et al. ........................... | 395/712 |
| 5,579,529 | 11/1996 | Terrell et al. ........................... | 395/828 |
| 5,745,439 | 4/1998 | Nepple .................................... | 368/10 |
| 5,768,594 | 6/1998 | Blelloch et al. ........................ | 395/706 |

OTHER PUBLICATIONS

"Cooperative Software"; Practical Programmer; Communications of the ACM; Apr., 1993; vol. 36; No. 4; pp. 23–28.
Smith, et al. "KIDSIM: Programming Agents Without a Programming Language"; Communications of the ACM; Jul., 1994; vol. 37; No. 7; pp. 55–67.
"Post Memory Manager Specifications"; Version 1.0; Phoenix, et al.; copyright 1996; pp. 1–10.
IBM Personal System/2 Hardware Interface Technical Reference, Keyboard and Auxilliary Device Controller (Type 1), (IBM Pub. N.00F9809), pp. 1–16.
USB Technical Information; USB Technical Presentations; Nov. 5, 1996; pp. 1–3.
Plug and Play SCSI Specification; Version 1.0; Mar. 30, 1994; Adaptec, et al.; pp. 1–26.
Desktop Management BIOS Specification; Version 2.0; Mar. 6, 1996; American Megatrends, Inc., et al.; pp. 1–4.
Plug and Play BIOS Specification; Version 1.0A; May 5, 1994; Compaq Computer Corporation, et al.; pp. 1–56.
Plug and Play BIOS Clarification Paper; Version 1.0A; Oct. 6, 1994; Compaq Computer Corporation, et al.; pp. 1–9.
BIOS Boot Specification; Version 1.01; Jan. 11, 1996; Compaq Computer Corporation, et al.; pp. 1–46.

(List continued on next page.)

*Primary Examiner*—Gopal C. Ray
*Attorney, Agent, or Firm*—Foley & Lardner

[57] ABSTRACT

A single controller handles keyboard functions and ACPI configuration and power management functions, while providing priority to keyboard functions so that there is no end user-perceptible compromise of keyboard functionality. When an interrupt is received by the microcontroller, it is determined whether the interrupt is an embedded controller interrupt received at the embedded controller host interface or a keyboard interrupt received at the keyboard host interface. If the interrupt is a keyboard interrupt, the keyboard function is handled in a standard fashion. If the interrupt is an embedded controller interrupt for an ACPI configuration or power management function, a burst timer is started and the command is handled by a command dispatcher. If the embedded controller is in burst mode, multiple commands may be received during a burst period. Commands which are not completed before the expiration of the burst timer are aborted, and a data return vector is set to the absolute address at the point of abortion in the firmware. Aborted commands are resumed on reception of the next embedded controller interrupt by continuation of the process at the data return vector address.

23 Claims, 5 Drawing Sheets

OTHER PUBLICATIONS

Smart Battery Specifications; Nov. 5, 1996; Intel; pp. 1–2.

Plug and Play ISA Specification; Version 1.0a; May 5, 1994; Intel, et al.; pp. 1–62.

Plug and Play Specifications; Microsoft; Dec. 10, 1996; pp. 1–2.

BIOS Enhanced Disk Drive Specification; Version 1.1; May 9, 1995; Phoenix Technologies Ltd.; pp. 1–17.

El Torito Bootable CD–ROM Format Specification; Version 1.0; Jan. 25, 1995; Phoenix Technologies, et al., pp. 1–20.

Phoenix Specifications Library; Nov. 5, 1996; Phoenix Technologies, Ltd.; pp. 1–5.

USING FIRMWARE TO ENHANCE THE FUNCTIONALITY OF A CONTROLLER

FIELD OF THE INVENTION

The present invention is related to enhancing the functionality of one controller or other control device to accomplish the tasks of multiple controllers through the programming of firmware, rather than additional hardware or wiring. In particular, the present invention is related to the embedded controllers of Advanced Configuration Power Interface (ACPI)-compatible personal computer platforms and, more particularly, to the embedded controllers of ACPI-compatible computers for keyboard functions and power management and configuration functions.

BACKGROUND OF THE INVENTION

A keyboard controller is a microprocessor whose primary function is to wait for, and report on, keystrokes on the keyboard. It is advantageous to dedicate a microprocessor to the keyboard since this reduces the number of tasks performed by the computer's primary microprocessor and can substantially increase its efficiency. Traditionally, the keyboard controller also generates system management interrupts (SMI's) to notify the basic input/output system (BIOS) of power management events such as the thermal conditions of the motherboard, the amount of charge on the battery, or hot keys functions. Hot key functions are one- or two-keystroke commands that switch a user to a different program, typically a program to perform a power management or configuration function that is loaded into memory at boot-up and is ready and waiting for use. And it is important to note that traditionally power management and configuration functions are performed without participation by the operating system—the BIOS processes the event, makes the needed changes and then returns control to the operating system.

An advanced power management standard, termed the "Advanced Configuration Power Interface" (ACPI), has been jointly proposed by Intel Corporation of Santa Clara, Calif., Microsoft Corporation of Redmond, Wash., and Toshiba Corporation of Tokyo, Japan. According to the ACPI specification, the operating system rather than the BIOS controls power management, thermal states, and plug-and-play functionality (wherein enumeration and configuration of motherboard devices is performed by the operating system) of the computer. This allows the operating system to evolve independently from the hardware, so that ACPI-compatible computers can gain the benefits of improvements and innovations in the operating system. Furthermore, this allows the hardware to evolve independently from the operating system, thereby decoupling hardware and operating system cycles. Incorporated herein by reference in its entirety is the ACPI specification, a current draft of which can be found on the world wide web at www.teleport.com/~acpi/.

Figure 1A:
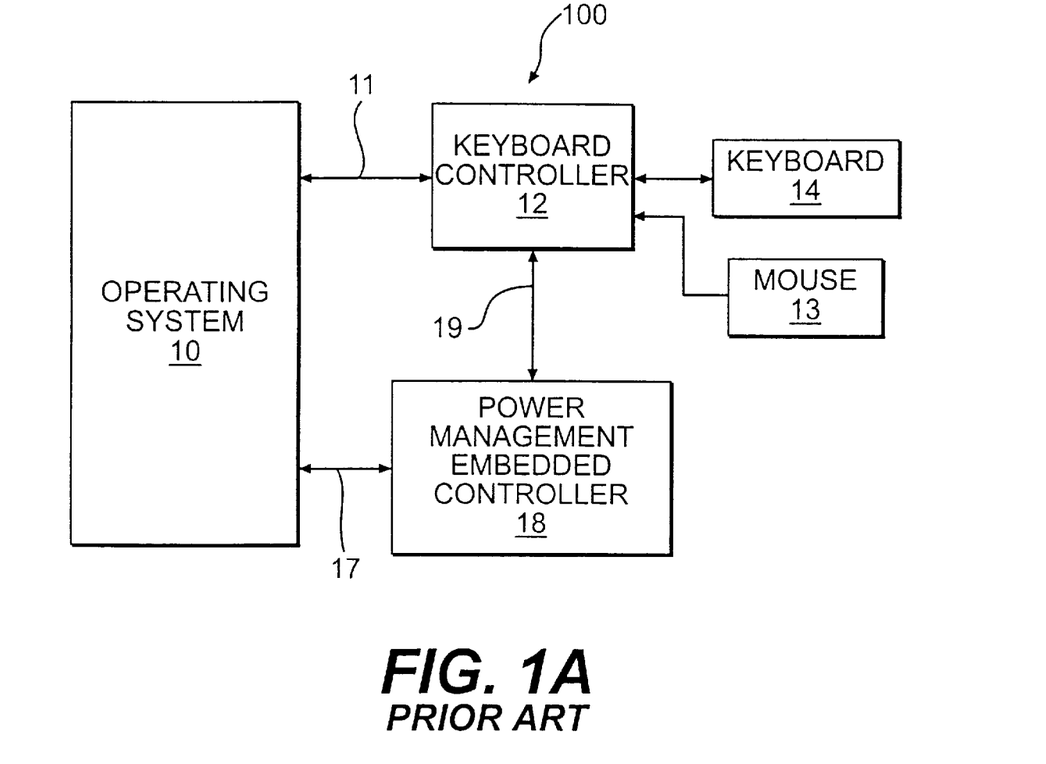
FIG. 1A shows a block diagram of the interrelations between the keyboard, mouse, keyboard controller, embedded controller and operating system for a prior art system.

An embedded controller interface can define and control communications between an operating system driver and one or more embedded controllers, where at least one embedded controller is dedicated to power management and configuration events. Typical keyboard interface conventions are described in "IBM Personal System/2 Hardware Interface Technical Reference, Keyboard and Auxiliary Device Controller (Type 1) (IBM Pub. N.00F9809)" which is also incorporated herein by reference in its entirety. FIG. 1A depicts the standard interrelations between the operating system 10, keyboard controller 12, power management embedded controller 18, mouse 13 and keyboard 14. Keystrokes, mouse movements and hot key depressions at the mouse 13 or keyboard 14 are forwarded to the keyboard controller 12, and commands controlling the LED's on the keyboard 14 are forwarded from the keyboard controller 12 to the keyboard. Those tasks which are not related to power management or configuration events are forwarded via a keyboard controller interface 11 directly to the operating system 10. However, power management and configuration events are detected by the keyboard controller 12 and reported to the power management embedded controller 18 via an interconnecting serial interface channel 19. The power management embedded controller 18 accumulates all events and reports them to the operating system 10 via an embedded controller bus 17, or to an SMI handler (not shown) if the platform is not ACPI-compatible. However, this implementation has the drawbacks that an additional embedded controller 18 and additional wiring 17 and 19 is required, and support for the communications channels 17 and 19 must be supplied. As a result this approach increases cost, size, complexity and power consumption, and decreases the reliability of the system. However, it is important to understand that whatever means are used to handle power management and configuration functions, the functionality of the mouse 13 and keyboard 14 must not be compromised to the extent that delays or dropouts are perceptible to the end user.

Therefore it is an object of the present invention to provide a means compatible with legacy systems and ACPI systems for handling power management and/or configuration functions.

Furthermore, it is an object of the present invention to provide a means for handling power management and/or configuration functions with a minimum of cost, size, and/or complexity.

It is another object of the present invention to provide a means for handling keyboard functions and power management/configuration events without end user-perceptible compromise of keyboard functionality.

It is another object of the present invention to provide means for combining the functionality of two universal microcontrollers into one universal microcontroller, while providing priority to the handling of one set of functions.

Further objects and advantages of the present invention will become apparent from a consideration of the drawings and the ensuing detailed description.

SUMMARY OF THE INVENTION

The present invention also provides a utility for adapting a microcontroller to handle a first set of higher-priority functions and a second set of lower-priority functions using firmware. The utility includes means for receiving a notification of a function to be performed and means for determining whether the function to be performed is one of the first set of higher-priority functions or one of the second set of lower-priority functions. The function associated with the notification is executed if the notification is for one of the first set of higher-priority functions. A timer is started if the notification is for one of the first set of lower-priority functions and the timer has not already been started. The execution of the function associated with the notification is begun after starting the timer if the notification is for one of the first set of lower-priority functions. The execution of the function is aborted if not completed before expiration of the timer and stored an address of a point of abortion of the function in a data return vector. The execution of the function is resumed if previously aborted due to the expiration of the timer upon reception of a subsequent notification, by continuation at the address stored by the data return vector.

The present invention is also directed to a method for using a controller for handling a first set of high-priority tasks and a second set of lower-priority tasks. When a task interrupt is received, it is determined whether it is for one of the high-priority tasks or one of the lower-priority tasks. If the task interrupt is for one of the high-priority tasks, then the function associated with the task interrupt is executed. If the task interrupt is for one of the lower-priority tasks, then a burst period timer is started and the function associated with the task interrupt is executed. If the microcontroller is in burst mode, then any additional functions received at the second port prior to the expiration of the burst period timer are also executed.

In a computer system with an operating system and firmware, the present invention provides a device for handling a first set of higher-priority functions and a second set of lower-priority functions using the firmware. The device is configured to: receive a notification of a function to be performed; determine whether the function to be performed is one of the first set of higher-priority functions or one of the second set of lower-priority functions; execute the function associated with the notification if the notification is for one of the first set of higher-priority functions; start a timer if the notification is for one of the first set of lower-priority functions and the timer has not already been started; begin execution of the function associated with the notification after starting the timer if the notification is for one of the first set of lower-priority functions; abort the function if not completed before expiration of the timer, and store an address of a point of abortion of the function in a data return vector; and resume execution of the function if previously aborted due to the expiration of the timer upon reception of a subsequent notification, by continuation at the address stored by the data return vector.

BRIEF DESCRIPTION OF THE DRAWINGS

The accompanying drawings, which are incorporated in and form a part of the present specification, illustrate embodiments of the invention and, together with the Detailed Description, serve to explain the principles of the invention.

DETAILED DESCRIPTION OF THE PREFERRED EMBODIMENT

Figure 1B:
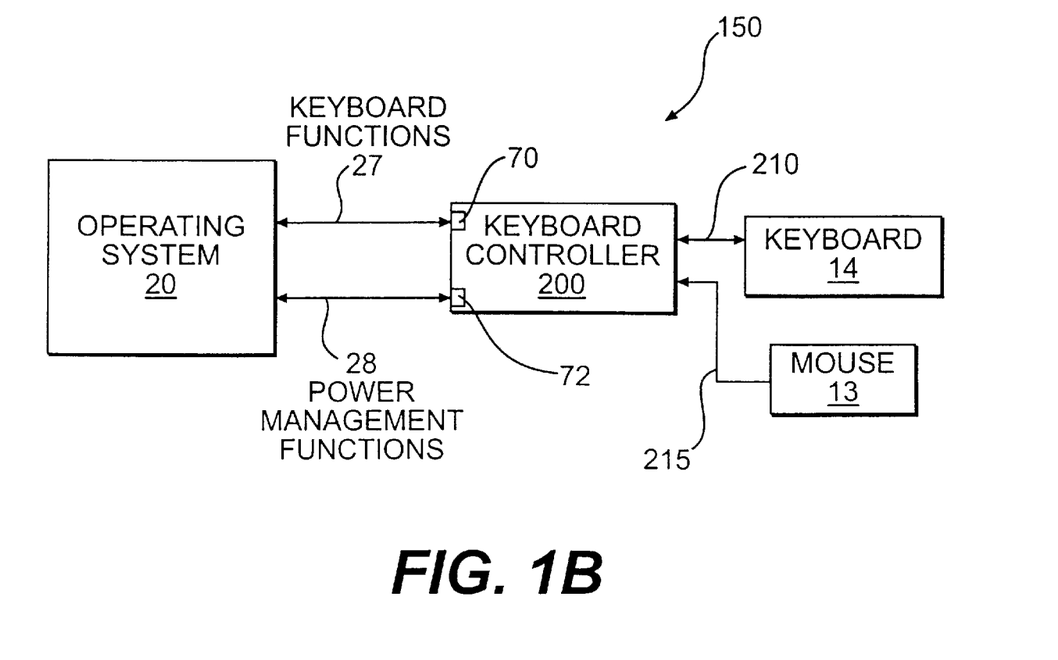
FIG. 1B shows a block diagram of the interrelations between the keyboard, mouse, keyboard controller and operating system for the ACPI-compatible system of the present invention.

A keyboard controller generally monitors keystrokes on the keyboard, and the movement of a mouse or trackball to control the position of the cursor. Traditionally, as was discussed in reference to the prior art system 100 of FIG. 1A, the power management and configuration functions which an end user can control via the mouse 13 and/or the hot keys on the keyboard 14 are routed via the keyboard controller 12 to a separate embedded controller 18. In contrast, the present invention takes advantage of the fact that standard keyboard controllers have two identical host interface channels which are both ACPI and legacy compliant. As shown in FIG. 1B, the system 150 of the present invention utilizes multitasking software to allow a single keyboard controller 200 having two host interfaces 70 and 72 to route power management functions via a power management function interface 28 and standard keyboard functions generated by keystrokes on the keyboard 14 or mouse events 13 via a standard keyboard functions interface 27 to the operating system 20.

Figure 2:
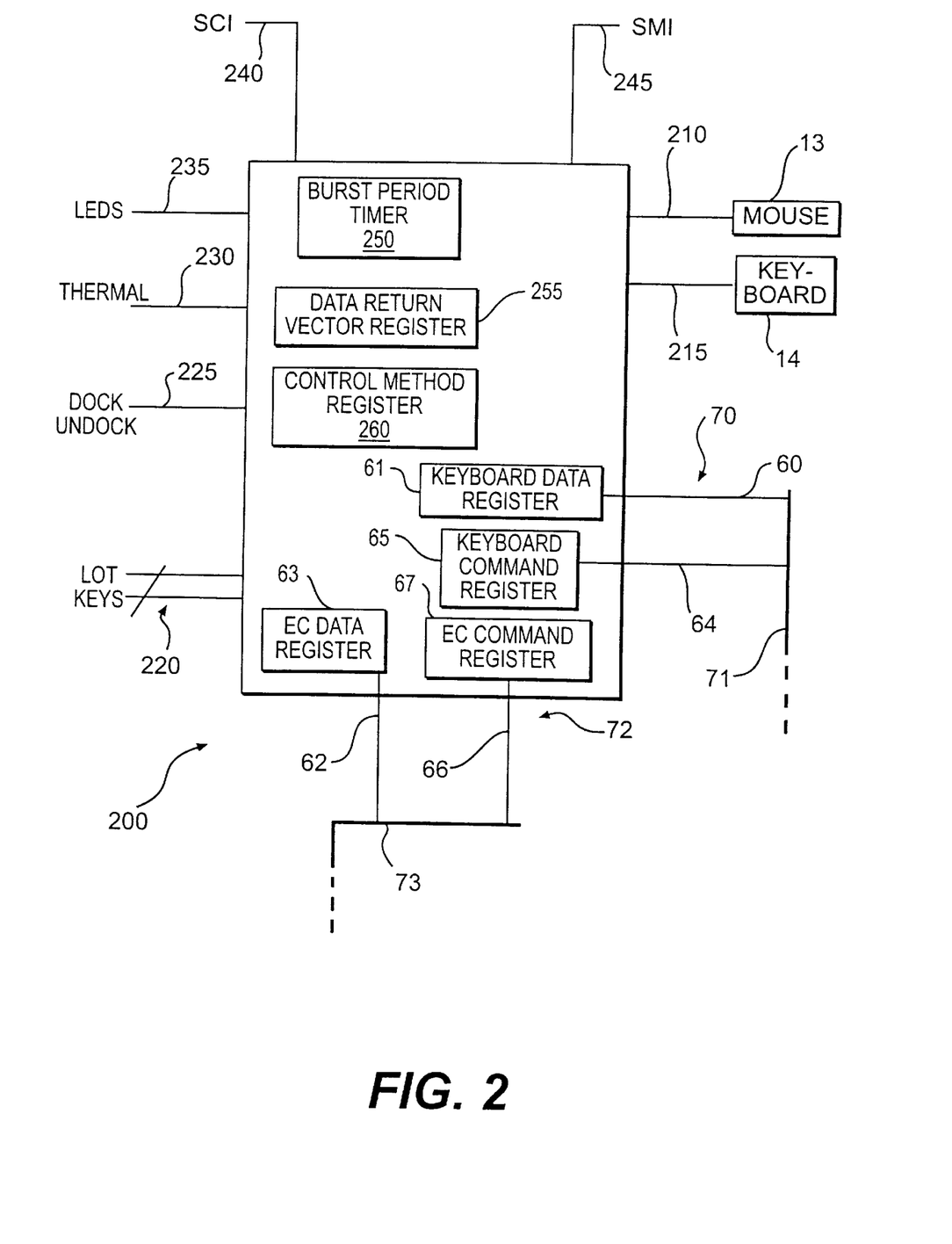
FIG. 2 shows a schematic diagram of a standard keyboard controller.

FIG. 2 is a schematic of standard keyboard controller 200, such as the 8042 keyboard controller manufactured by Intel of Santa Clara, Calif. with two identical host interfaces 70 and 72. The keyboard controller 200 includes bus 210 for communications with a mouse, bus 215 for communications with the keyboard 14, hot key communications buses 220, a dock/undock bus 225, a thermal events bus 230, a light emitting diodes (LED's) bus 235, a system control interrupts (SCI) bus 240, a system management interrupts (SMI) bus 245, a first host interface 70, and a second host interface 72. The first interface 70 (which for the sake of convenience will be assumed to be the keyboard function interface) has a data port 60 and a command port 64 accessed by a system I/O bus 71, and the second interface 72 (which for the sake of convenience will be assumed to be the embedded controller interface) also has a data port 62 and a command port 66 accessed by a system 1/O bus 73 which may be the same bus as system I/O bus 71. (The reference numerals for the data port 60 and the command port 64 have been chosen to be the hexadecimal addresses of the KBC_DATA and KBC_SC ports on bus 71 for PC AT compatible platforms, and the reference numerals for the data port 62 and the command port 66 have been chosen to be the hexadecimal addresses of the EC_DATA and EC_SC ports on bus 73 for most current ACPI-compatible platforms.) As discussed in detail below, the keyboard controller includes an internal burst period timer 250, a data return vector register 255, and a control method register 260.

Data ports 60 and 62 are connected to data registers 61 and 63, and these ports 60 and 62 are used to transfer data between the host and the embedded controller 200. Command ports 64 and 66 are connected to a status/command registers 65 and 67, and each of these registers actually acts as two registers: a status register for reads to host interfaces 70 and 72, and a command register for writes to host interfaces 70 and 72.

When a status/command register 67 is used to convey status for the embedded controller host interface 72 (command register bit assignments and command protocols for the keyboard function host interface 70 follow a separate set of conventions, as is specified in the ACPI specification), the zeroth bit of the register 67 is an output buffer full (OBF) flag which is used to indicate when the output buffer is fill, and so the data at the embedded controller data register 63 is ready for the host 20. The OBF flag is set when the embedded controller 200 has written a byte of data into the data register 63, but the host 20 has not yet read the data. Once the host 20 determines that the OBF flag is set, the host 20 reads the register 63 to retrieve the byte of data placed there by the embedded controller 200. Once the data is retrieved by the host 20, the OBF flag is automatically cleared by the hardware, signaling the embedded controller 200 that the data has been read and new data can be placed at the data register 63.

The first bit of the embedded controller status/command register 67 is an input buffer full (IBF) flag which is used to indicate whether the input buffer is full, and so the byte of data at the register 63 is ready for the embedded controller 200. The IBF flag is set when the host 20 has written a byte of data into the data register 63, but the embedded controller 200 has not yet read the data. Once the embedded controller determines that the IBF flag is set, the embedded controller 200 reads the data register 63 to retrieve the byte of data placed there by the host 20. Once the data is retrieved by the embedded controller 200, the IBF flag is automatically cleared by the hardware signaling to the host 20 that the data has been read and new data can be placed at the data register 63.

The third bit of a status/command register 67 is used as a command/data flag to indicate whether the data in the data register 63 is data or a command, and the fourth bit is used as a flag to indicate whether the controller is in burst mode for polled command processing, or in normal mode for interrupt-driven command processing. In burst mode, the embedded controller 200 discontinues normal processing and waits for a series of commands to be sent from the host 20. This allows the host 20 to quickly read or write several bytes of data at a time without the overhead of SCI's between the commands.

The fifth bit of a status/command register 67 is an SCI event flag used differentiate notification SCI's from command-complete SCI's. The SCI event flag is set by the embedded controller 200 when it 200 detects an internal event that requires the attention of the operating system 20 and sends an SCI to the operating system 200.

The sixth bit is an SMI event flag to indicate whether a system management interrupt (SMI) event is pending. The SMI event flag is set by the embedded controller 200 when it 200 detects an internal event that requires the attention of the system management interrupt handler (not shown), and sends an SMI to the system management interrupt handler.

In read mode, a single byte of data is read from the embedded controller 200 by the host 20. In write mode, a single byte of data is written to the embedded controller 200 by the operating system 20. In read mode, the host directs the read command value to a command port 66, followed by an address byte directed to a data port 62, respectively, and the embedded controller 200 returns the byte stored at the addressed location. In write mode, the host writes the write command value to a command port 66, followed by an address byte to the associated data port 62, followed by a data byte to the associated data port 62, and the data is written to the addressed location in the embedded controller 200. The read and write command values are reserved for exclusive use by the operating system 20, and these commands indicate to the embedded controller 200 that SCI's, rather than SMI's, are to be generated in response to related transactions.

Burst mode is enabled by setting the fourth bit of the status byte to the burst flag value, and is disabled when the burst flag is reset. In burst mode, the embedded controller 200 devotes dedicated attention to the operating system 20 (or SMI handler for legacy systems), and all tasks performed by the embedded controller 200 are suspended for a burst period. This allows the host processor to issue a number of commands, such as reads or writes, in succession, in order to reduce the latency at the embedded controller interface 11 or 27 or 28. However, if the embedded controller 200 must process a critical event, it may disengage from burst mode. If the host does not issue a command within a burst period, the embedded controller 200 will transition to a burst disable state. However, if the burst flag is not reset by the end of the burst period, the embedded controller disables the burst mode and sends a SCI via SCI port 205 to the operating system 20.

When the SCI event flag in a status command register 67 is set, the embedded controller 200 is put in query mode by the operating system 20 in order to determine the cause of the SCI event. When the embedded controller 200 detects an event that must be communicated to the operating system 20 via an SCI, it 200 sets the SCI flag, generates an SCI, and waits for the operating system 20 to send a query command. Upon receipt of the query command, the embedded controller 200 sets the associated data register 63 to a notification value between 0 and 255 to indicate to the operating system 20 which interrupt handler operation should be performed.

According to the preferred embodiment of the present invention, keyboard functions and power management and configuration functions are handled by a "dual-port" (i.e., a dual-interface) keyboard controller, and directed to the operating system if the platform is ACPI compatible, or directed to an operating system-transparent handler if the platform is not ACPI compatible. The functionality of the keyboard controller is enhanced to accomplish the tasks of two embedded controllers through the programming of firmware, rather than additional hardware or wiring. It should be noted that although the present invention is discussed in terms of the combination of the functionality of the keyboard controller with another embedded controller, the present invention can be applied to a pair of embedded controllers of any type, or to the combination of the functionality of more than two embedded controllers. The present invention can also be applied to other control units such as an adapter or hardware device that performs the physical data transfers between memory and a peripheral device. However, the combination of the keyboard controller and the embedded controller for power management and configuration events is a particularly advantageous pairing, since the keyboard controller monitors depressions of the hot keys, and these hot key events must be communicated to the power management and configuration handlers of the ACPI. If the keyboard controller and the embedded controller for power management and configuration events are separated, they must somehow be interconnected anyway. Therefore, the combination of the two controllers not only eliminates a controller to provide a reduction in cost, size and power consumption, the elimination of the interconnection between the controllers further reduces cost, size and power consumption.

Figure 3:
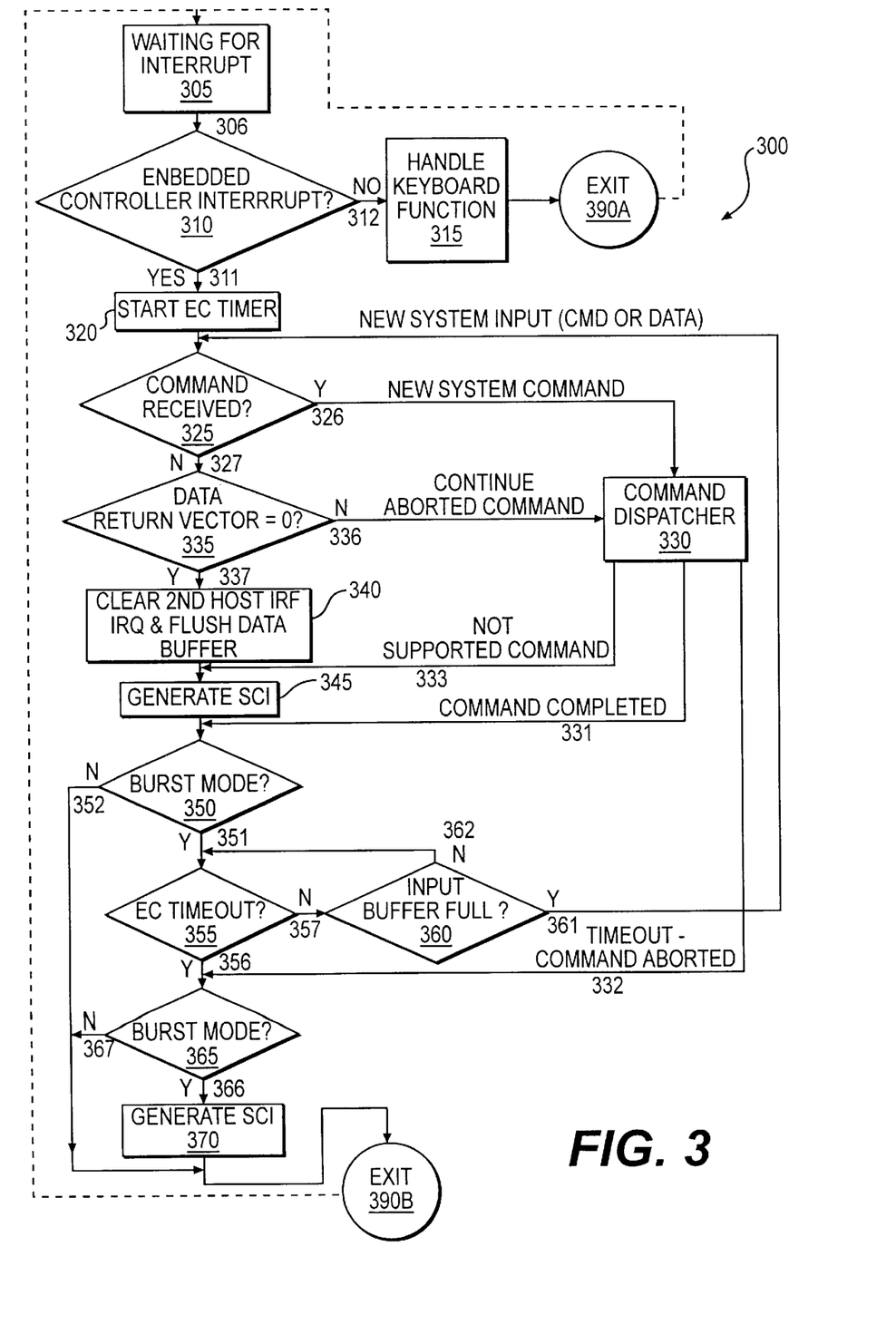
FIG. 3 provides a flowchart depicting the process of the present invention.

As depicted in FIG. 3, the process of the present invention begins with the system awaiting 305 an interrupt. When an interrupt is received 306, it is then determined 310 whether the interrupt was received at the embedded controller port (for ease of discussion it will be assumed henceforth that interface 72 is the embedded controller host interface and host interface 70 is the keyboard function host interface, although in practice the assignment may be reversed). If not 312, then the interrupt was sent to the host interface 70 for keyboard functions and the keyboard command is handled 315 and the process is exited 390A, i.e., the keyboard controller again awaits 305 an interrupt. Otherwise 311, the interrupt was sent via to the host interface 72 for embedded controller functions. Because the operating system expects an embedded controller function, such a burst mode communication, to be handled within a limited amount of time, the internal timer 250 is started 320 in case the command is a burst mode command. The time from when the embedded controller timer 250 is started to when the time limit expires is termed the "burst period." If the function is a single read or write, rather than a burst mode communication consisting of a "burst" of reads and/or writes, the function can easily be handled within the burst period. The time limit imposed by the internal timer 250 also insures that the time allocated to handling embedded controller functions is short enough that discontinuation of the mouse and keyboard functions are not noticeable to the computer user. The time limit imposed on the handling of embedded controller functions provides the capability that the keyboard and mouse are effectively available to the user even when power management or configuration prompts, such as dialog boxes, are displayed.

Next, it is determined 325 whether the event signaled by the interrupt is the reception of a command or data. If a command was received 326, then control is passed to the command dispatcher 330, the functions of which 330 are described in detail below in connection with the flowchart of FIG. 4. If the command dispatcher 330 completes its operations within the burst period, then control passes along flowchart path 331. However, if the command dispatcher 330 does not complete its operations within the burst period, then a "timeout" has occurred and the command must be aborted, and control passes along flowchart path 332. Or, if the command received by the command dispatcher 330 is not a supported command, then control passes along flowchart path 333, and an SCI is generated 345 to notify the host that the command was processed.

However, if a command was not received 327, then data was received at the embedded controller host interface 72, and the data return vector stored in the data return vector register 255 is tested 335. As will be discussed in more detail below, the data return vector is set to a nonzero value when a command is aborted. Therefore, if the data return vector does not have a value of zero 336, then a command was received at the embedded controller host interface 72 during the previous communication, and control is passed to the command dispatcher 330 to handle the reception of the data, as described in detail below in connection with the flowchart of FIG. 4. Otherwise, the data return vector has a zero value 337 and a command has not been received at the embedded controller host interface 72. This 337 is an illegal case, so 340 the current interrupt is cleared and the data in the data register 63 is flushed, and a SCI is generated 345 to notify the system that the data was processed.

Upon command completion 330 or generation of an SCI 345 after an unsupported command or a data register flush 340, it is determined 350 whether the embedded controller 200 is in burst mode. If the embedded controller 200 is not 352 in burst mode, then the process is exited 390B, and the embedded controller 200 awaits another interrupt 305. Otherwise, the embedded controller 200 is 351 in burst mode, and the burst period timer 250 is checked to determine 355 whether the burst period has expired. If the burst period has not expired 357, it is determined 360 whether another communication has been received resulting in the filling of the command register 67 or data register 63. If register 63 or 67 is not fill 362, then another communication has not been received and it is again checked 355 whether the burst period has expired, and the loop 355/357/360/362 continues until either the burst period expires 356 or a communication does 361 fill register 63 or 67. If a communication does 361 fill register 63 or 67, then control is passed back to the step of determining 325 whether a command was received (and it should be noted that the embedded controller timer 250 is not restarted since control passes to the process 300 below the step of starting 320 the embedded controller timer 250). However, if a command is not received 356 by the time the burst period expires, then it is determined 365 whether the embedded controller 200 has been set to burst mode. If the embedded controller 200 is 366 in burst mode, then a system control interrupt is sent 370 to the operating system to provide notification that the burst mode has been terminated because the burst period has expired, and the controller 200 awaits the next interrupt 305. Otherwise 367, the embedded controller 200 is not in burst mode, so the process is exited 390B, and the controller 200 awaits the next interrupt 305.

Figure 4:
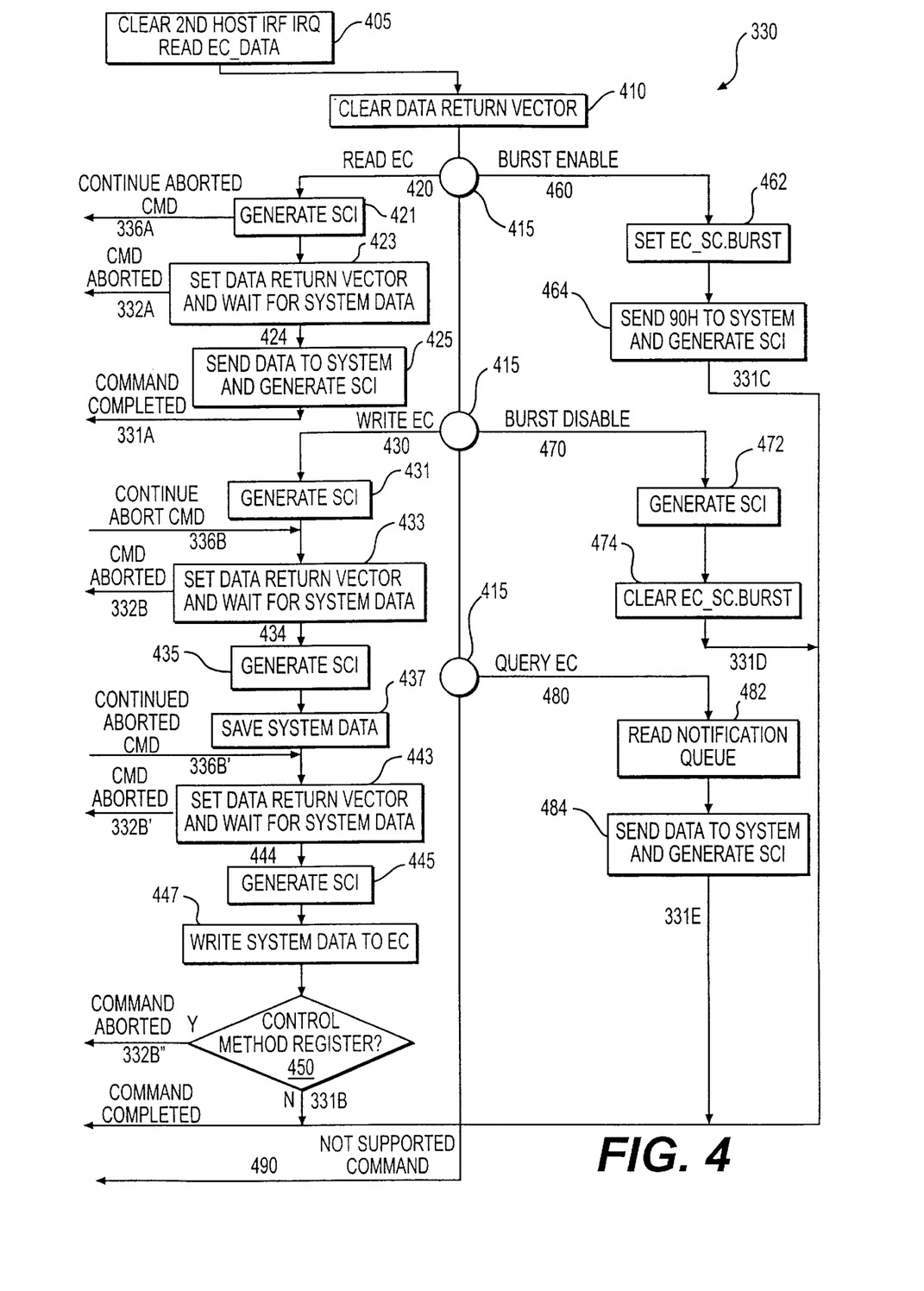
FIG. 4 provides a flowchart depicting the process of the command dispatcher of the present invention.

A flowchart showing the process of the command dispatcher 330 of the present invention is depicted in FIG. 4. The command dispatcher process 330 begins with 405 the clearing of the current interrupt and the reading of the data at the data register 63. It should be noted that in the computer system of the preferred embodiment of the present invention, the current interrupt must be cleared prior to the reading of the data, because the reading of data indicates that new data can be sent. If the operations were performed in the reverse order, another byte of data and another interrupt could immediately be sent to the data buffer, and the new interrupt, rather than the old interrupt would be cleared.

The data return vector in the data return vector register 255 is then cleared 410, i.e., set to zero, since the command has not (or at least not yet) been aborted. Next, the type of command sent to the embedded controller 200 is determined 415. If the command is a read, the process follows path 420; if the command is a write, the process follows path 430; if the command is a burst enable, the process follows path 460; if the command is a burst disable, the process follows path 470; if the command is a query, the process follows path 480; and if the command is not supported, the process follows path 490.

Figure 5:
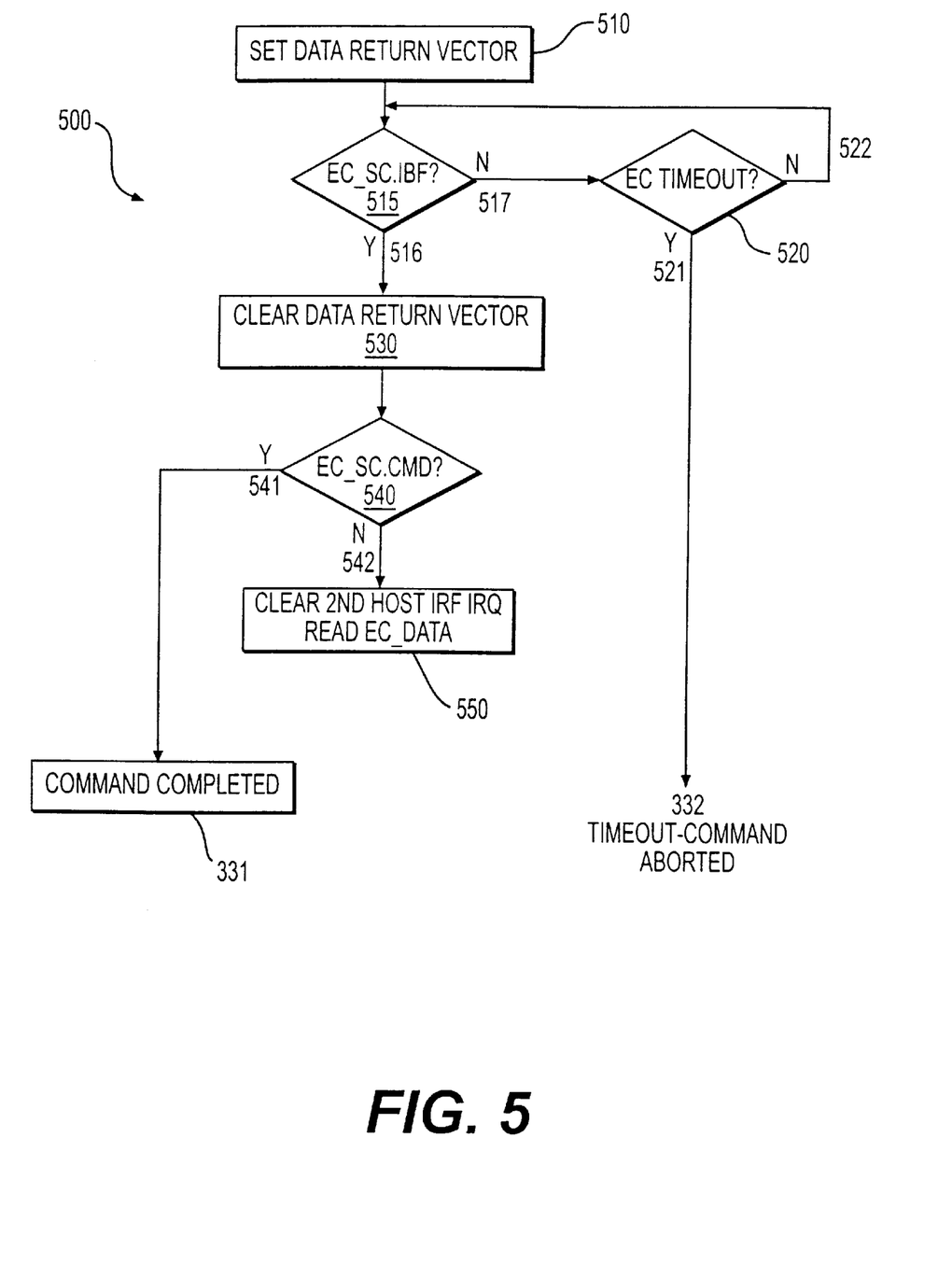
FIG. 5 provides a flowchart depicting the process by which the command dispatcher awaits system data according to the present invention.

If the command is a read 420, a system control interrupt is generated 421 to confirm reception of the read command. Then 423, the data return vector is set to the value of the absolute address in the firmware of this step of the process (which must have a nonzero value), and the embedded controller 200 awaits reception of data from the host to indicate the address from which the host is to read. (A flowchart for the process of waiting for system data is depicted in FIG. 5, and discussed in detail below.) Or, if an aborted command is to be continued 336A (corresponding to path 336 of FIG. 3 in the case of a read command), the process continues at the absolute address stored in the data return vector register 255, the data return vector is reset to the value of the absolute address in the firmware of this step of the process, and the embedded controller 200 awaits reception of a data byte from the host to indicate the address from which the host is to read. If the host does not send the data byte within the burst period, then the command is aborted 332A (corresponding to path 332 of FIG. 3 in the case of a read command). However, if the data byte for an address in the embedded controller space is received from the host within the burst period 424, then 425 the data at that address is sent back to the host, a system control interrupt indicating that the command has been completed is sent to the host, and the command dispatcher process 330 exits along a command completed path 331A (corresponding to path 331 of FIG. 3 in the case of a read command).

If the command is a write 430, a system control interrupt is generated 431 to confirm reception of a write command.

Then 433, the data return vector is set to the (nonzero) value of the absolute address of the process, and the embedded controller 200 awaits reception of data from the host to indicate the address in the embedded controller 200 to which the host is to write. (A flowchart for the process of waiting for system data is depicted in FIG. 5, and discussed in detail below.) Or, if an aborted command is to be continued 336B (corresponding to path 336 of FIG. 3 in the case of a write command), control is returned to the absolute address stored at the data return vector register 255, and 433 the data return vector is set to the current absolute address of the process while the embedded controller 200 awaits reception of data from the host to indicate the address to which the host is to write. If the host does not send the address within the burst period, then the command is aborted 332B (corresponding to path 332 of FIG. 3 in the case of a write command). However, if the address in the embedded controller space is received 434 from the host within the burst period, then a system control interrupt indicating that the address has been received is sent 435 to the host, and the address at data register 63 is saved 437. Then 443, the data return vector is reset to the value of the absolute address of the process, and the embedded controller 200 awaits reception of the byte to be written to the previously received address. Or, if an aborted command is to be continued 336B' (corresponding to path 336 of FIG. 3 in the case of a write command where the address was received, but the data to be written to the address was not received), control is returned to the process at the absolute address stored in the data return vector register 255, the data return vector register 255 is reset 443 to the value of the absolute address of the process, and the embedded controller 200 awaits 443 reception of data to be written to the address. If the host does not send the data within the burst period, then the command is aborted 332B' (corresponding to path 332 of FIG. 3 in the case of a write command where the address was received, but the data to be written to the address was not received). However, if the byte to be written to the address in the embedded controller space is received 444 from the host within the burst period, then a system control interrupt indicating that the address has been received is sent 445 to the host, and the byte is written 447 to the address in the embedded controller space.

According to the preferred embodiment of the present invention, a control method register 260 is used to receive high-priority write data from the BIOS, and an additional decision 450 is included in the handling of a write to the embedded controller 200 to allow a high-priority write from the BIOS to abort burst mode. In particular, if it is determined that the address of the write command is the control method register, then burst mode is aborted 332B". Otherwise, the write was not made to the control method register and the command dispatcher process 330 exits along a command completed path 331B (corresponding to path 331 of FIG. 3 in the case of a write command).

If the command received by the embedded controller 200 is a burst enable 460, then the burst enable flag (EC_SC.BURST) is set 462, an acknowledgment (90*h*) and a system control interrupt are sent back 464 to the host, and the command dispatcher process 330 exits along a command completed path 331C (corresponding to path 331 of FIG. 3 in the case of a burst enable). Similarly, if the command received by the embedded controller 200 is a burst disable 470, then a system control interrupt is sent back 472 to the host, the burst enable flag (EC_SC.BURST) is cleared 474, and the command dispatcher process 330 exits along a command completed path 331D (corresponding to path 331 of FIG. 3 in the case of a burst disable). Finally, if the command received by the embedded controller 200 is a query 480, then a read 482 is made from the internal notification queue (i.e., the firmware queue for all events generated by the embedded controller 200, such as hot key depressions), and identification of the event and a system control interrupt are sent 484 to the host, and the command dispatcher process 330 exits along a command completed path 331E (corresponding to path 331 of FIG. 3 in the case of a query).

FIG. 5 shows a flowchart 500 for steps 423, 433 and 443 of FIG. 4 for the setting of the data return vector and waiting for host data, which are reached either by an unaborted embedded controller read 420 or write 430, or the continuation of an aborted read 336A or write 336B or 336B'. First, the data return vector is set 510 to the current value of the absolute address of the process. Then the input buffer full flag (EC_SC.IBF) is checked 515 to determine if input has been received, and if not 517 then it is determined 520 whether a timeout has occurred. If a timeout has not yet occurred 522, then the EC_SC.IBF flag is again checked 515 and the loop 515/517/520/522 continues until either host input is received 516 or a timeout has occurred 521. If a timeout occurs 521, then the command is aborted 332. If system input is received 516, then the data return vector is cleared 530 and it is determined 540 whether the data or command is sent by the host. If 541 a command is sent by the host while the embedded controller 200 is waiting for data then the process 500 is completed and control is transferred along path 331 (see FIG. 3). If 542 the data which is awaited by the embedded controller 200 is received, then the current interrupt is cleared and the data is read 550 to complete the process 500, and steps 423, 433 and 443 of FIG. 4 proceed to subsequent steps 425, 435 and 445, respectively.

Although the above description contains specific examples, these should not be construed as limiting the scope of the invention, but as merely providing illustrations of some of the preferred embodiments of this invention. Many variations are possible and are to be considered within the scope of the present invention. For instance: a control method register may not be provided in the embedded controller, and burst mode may not be disabled for high-priority writes from the BIOS; the universal microcontroller may not be an 8042 keyboard controller; other microcontrollers or microcomputers may be used instead of a dual-port universal microcontroller; system control interrupts and system management interrupts may share a single bus on the keyboard controller; etc. Thus, the scope of the invention should be determined not by the examples given herein, but rather by the appended claims and their legal equivalents.

What is claimed is:

1. A utility for adapting a controller for handling a first set of higher-priority functions and a second set of lower-priority functions using firmware, the utility comprising:

means for receiving a notification of a function to be performed;

means for determining whether the function to be performed is one of the first set of higher-priority functions or one of the second set of lower-priority functions;

means for executing the function associated with the notification if the notification is for one of the first set of higher-priority functions;

means for starting a timer if the notification is for one of the first set of lower-priority functions and the timer has not already been started;

means for beginning execution of the function associated with the notification after starting the timer if the notification is for one of the first set of lower-priority functions;

means for aborting the function if not completed before expiration of the timer, and storing an address of a point of abortion of the function in a data return vector; and means for resuming execution of the function if previously aborted due to the expiration of the timer upon reception of a subsequent notification, by continuation at the address stored by the data return vector.

2. The utility of claim 1 wherein the utility further comprises means for returning control to the means for receiving the notification if the function is a burst enable function and the expiration of the timer has not occurred, the burst enable function being one of the lower-priority functions.

3. The utility of claim 1 wherein the controller is interfaced with BIOS firmware.

4. The utility of claim 1 wherein the controller is interfaced with an operating system of a computer.

5. The utility of claim 1 wherein the controller is a dual-interface microcontroller.

6. The utility of claim 5 wherein the notification is received at a first interface of the dual-interface microcontroller if the current function is one of the higher-priority functions and the notification is received at a second interface of the dual-interface microcontroller if the current function is one of the lower-priority functions.

7. The utility of claim 1 wherein the first set of higher-priority functions are keyboard functions and the second set of lower-priority functions are power management and configuration functions.

8. The utility of claim 1 wherein the utility is stored on a computer readable storage device.

9. A method for use of a controller for handling a first set of high-priority tasks and a second set of lower-priority tasks, comprising the steps of:

(a) receiving a task interrupt;

(b) determining whether the task interrupt is for the first set of high-priority tasks or the second set of lower-priority tasks;

(c) executing a current function associated with the task interrupt if the task interrupt is for one of the first set of high-priority tasks;

(d) starting a burst period timer if the task interrupt is for one of the second set of lower-priority tasks;

(e) executing the current function associated with the task interrupt if the task interrupt is for the one of the second set of lower-priority tasks; and (f) returning to step (e) if an additional communication for execution of an additional function is received prior to expiration of the burst period timer and if the controller is in burst mode, where the current function is defined as the additional function.

10. The method of claim 9 wherein step (e) includes the steps of:

(g) determining whether a command portion of the current function has been received;

(h) setting a data return vector to a current address if the command portion is a read command or a write command;

(i) aborting step (e) if a first data portion of the current function is not received prior to the expiration of the burst period timer; and (j) executing the current function and clearing the data return vector if the first data portion of the current function is received prior to the expiration of the burst period.

11. The method of claim 10 wherein step (e) further includes the steps of:

(k) determining if the data return vector has been cleared, if in step (g) it is determined that the command portion of the current function has not been received; and (l) returning to step (e) at the current address stored as the data return vector if in step (k) it is determined that the data vector has not been cleared.

12. The method of claim 11 wherein the command portion is the read command and contents of an address specified by the first data portion is read from the controller.

13. The method of claim 11 wherein the command portion is the write command and an address is written to in the controller specified by the first data portion.

14. The method of claim 13 where, if the command portion is a write command, step (j) further includes the steps of:

(m) setting a data return vector to the current address; and (n) aborting step (e) if a second data portion of the current function is not received prior to the expiration of the burst period timer.

15. The method of claim 14 wherein the second data portion is written to the address specified by the first data portion in the controller.

16. The method of claim 13 wherein the burst mode is aborted if the first data portion is a control method register address.

17. The method of claim 9 wherein the controller is a dual-interface controller and the first set of high-priority tasks are directed to a first interface and a second set of lower-priority, tasks are directed to a second interface.

18. The method of claim 17 wherein the dual-interface controller is a keyboard controller, and the first set of high-priority embedded controller tasks are keyboard functions.

19. In a computer system with an operating system and firmware, the computer system comprising a device for handling a first set of higher-priority functions and a second set of lower-priority functions using the firmware, the device configured to:

receive a notification of a function to be performed;

determine whether the function to be performed is one of the first set of higher-priority functions or one of the second set of lower-priority functions;

execute the function associated with the notification if the notification is for one of the first set of higher-priority functions;

start a timer if the notification is for one of the first set of lower-priority functions and the timer has not already been started;

begin execution of the function associated with the notification after starting the timer if the notification is for one of the first set of lower-priority functions;

abort the function if not completed before expiration of the timer, and store an address of a point of abortion of the function in a data return vector; and resume execution of the function if previously aborted due to the expiration of the timer upon reception of a subsequent notification, by continuation at the address stored by the data return vector.

20. The computer system of claim 19 wherein the device is further configured to return a notification if the function is a burst enable function and the expiration of the timer has not occurred, the burst enable function is one of the lower-priority functions.

21. The computer system of claim 19 wherein the device is interfaced with the BIOS firmware or with the operating system.

22. The computer system of claim 19 wherein the device is a dual-interface microcontroller so that the notification is received at a first interface of the dual-interface microcontroller if the current function is one of the higher-priority functions and the notification is received at a second interface of the dual-interface microcontroller if the current function is one of the lower-priority functions.

23. The computer system of claim 19 wherein the first set of higher-priority functions are keyboard functions and the second set of lower-priority functions are power management and configuration functions.

* * * * *